United States Patent
Sazawa et al.

(10) Patent No.: US 10,185,496 B2
(45) Date of Patent: Jan. 22, 2019

(54) SYSTEM AND APPARATUS FOR REMOVING DUPLICATE IN DATA TRANSMISSION

(71) Applicant: FUJITSU LIMITED, Kawasaki-shi, Kanagawa (JP)

(72) Inventors: Shinichi Sazawa, Atsugi (JP); Hiroaki Kameyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/439,355

(22) Filed: Feb. 22, 2017

(65) Prior Publication Data

US 2017/0160950 A1    Jun. 8, 2017

Related U.S. Application Data

(63) Continuation of application No. PCT/JP2014/073379, filed on Sep. 4, 2014.

(51) Int. Cl.
*G06F 3/06* (2006.01)
*G06F 13/00* (2006.01)

(52) U.S. Cl.
CPC .............. *G06F 3/0608* (2013.01); *G06F 3/06* (2013.01); *G06F 3/061* (2013.01); *G06F 3/065* (2013.01);
(Continued)

(58) Field of Classification Search
CPC ...... G06F 3/0608; G06F 3/061; G06F 3/0619; G06F 3/0641; G06F 3/065; G06F 3/067
(Continued)

(56) References Cited

U.S. PATENT DOCUMENTS

2001/0044838 A1   11/2001   Iida
2010/0250858 A1*  9/2010   Cremelie .......... G06F 17/30159
                                                        711/136
(Continued)

FOREIGN PATENT DOCUMENTS

JP    2000-357121    12/2000
JP    2001-331661    11/2001
(Continued)

OTHER PUBLICATIONS

Extended European Search Report dated Aug. 24, 2017 in corresponding European Patent Application No. 14901016.7.
(Continued)

*Primary Examiner* — Than Nguyen
(74) *Attorney, Agent, or Firm* — Staas & Halsey LLP

(57) ABSTRACT

A reception-side apparatus determines whether or not data duplicating a part of received data from a transmission-side apparatus is stored in the first storage that stores first data which has been received, and notifies, when data duplicating a part of the received data is stored in the first storage, the transmission-side apparatus of prediction information on duplicate reception of the first data. A transmission-side apparatus compares, when the prediction information is received, second data to be transmitted and a part of the first data in a second storage that stores the first data which has been transmitted based on the prediction information, determines whether or not there is a first part of the first data matching the second data in the second storage, and transmits, when there is the first part of the first data in the second storage, outline information on the second data.

6 Claims, 15 Drawing Sheets

(52) U.S. Cl.
CPC ............ *G06F 3/067* (2013.01); *G06F 3/0619* (2013.01); *G06F 3/0641* (2013.01); *G06F 13/00* (2013.01)

(58) Field of Classification Search
USPC ......................................................... 711/162
See application file for complete search history.

(56) References Cited

U.S. PATENT DOCUMENTS

| | | | |
|---|---|---|---|
| 2011/0258239 A1* | 10/2011 | Petrocelli | G06F 3/0608 707/809 |
| 2012/0011101 A1 | 1/2012 | Fang et al. | |
| 2014/0006354 A1* | 1/2014 | Parkison | G06F 17/30194 707/649 |
| 2015/0178224 A1* | 6/2015 | Seo | G06F 21/64 711/166 |

FOREIGN PATENT DOCUMENTS

| | | |
|---|---|---|
| JP | 2003-108464 | 4/2003 |
| JP | 2009-21906 | 1/2009 |
| JP | 2011-175421 | 9/2011 |

OTHER PUBLICATIONS

International Search Report dated Dec. 9, 2014 in corresponding International Patent Application No. PCT/JP2014/073379.
International Written Opinion of the International Searching Authority dated Dec. 9, 2014 in corresponding International Patent Application No. PCT/JP2014/073379.

* cited by examiner

FIG.6

| TRANSMISSION-SIDE CACHE (PER APPLICATION) | |
|---|---|
| TRANSMISSION OFFSET | TRANSMITTED DATA |
| 0 | xyzxyz..... |
| 80000 | abcabc..... |

FIG.8

RECEPTION-SIDE CACHE

| HASH VALUE | APPLICATION ID | RECEPTION OFFSET | RECEIVED DATA |
|---|---|---|---|
| kkkkk | x | 0 | xyzxyz.... |
| hhhhh | x | 1000 | uvwuvw...... |
| ...... | | | |
| jjjjj | x | 80000 | abcabc..... |

FIG.9

DUPLICATION PREDICTION INFORMATION/DUPLICATION PREDICTION TABLE

| NUMBER | NAME | VALUE |
|---|---|---|
| 1 | CURRENT APPLICATION TYPE | IDENTIFICATION INFORMATION |
| 2 | DUPLICATION PREDICTION MODE | ON/OFF |
| 3 | DUPLICATE APPLICATION TYPE | IDENTIFICATION INFORMATION |
| 4 | CURRENT APPLICATION DUPLICATION START POSITION | OFFSET |
| 5 | DUPLICATE APPLICATION DUPLICATION START POSITION | OFFSET |
| 6 | PREDICTED DUPLICATION LENGTH | LENGTH OF DATA |

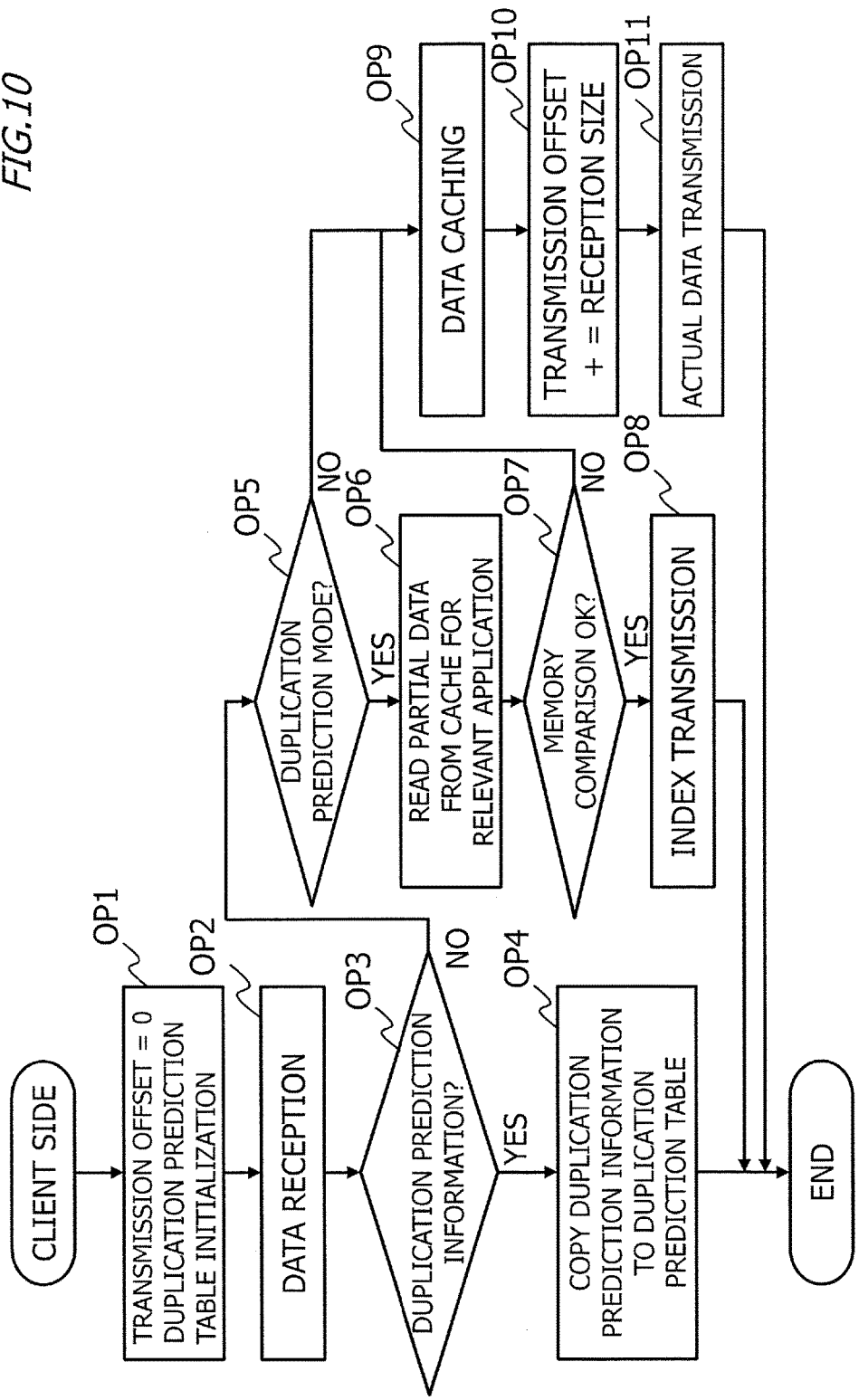

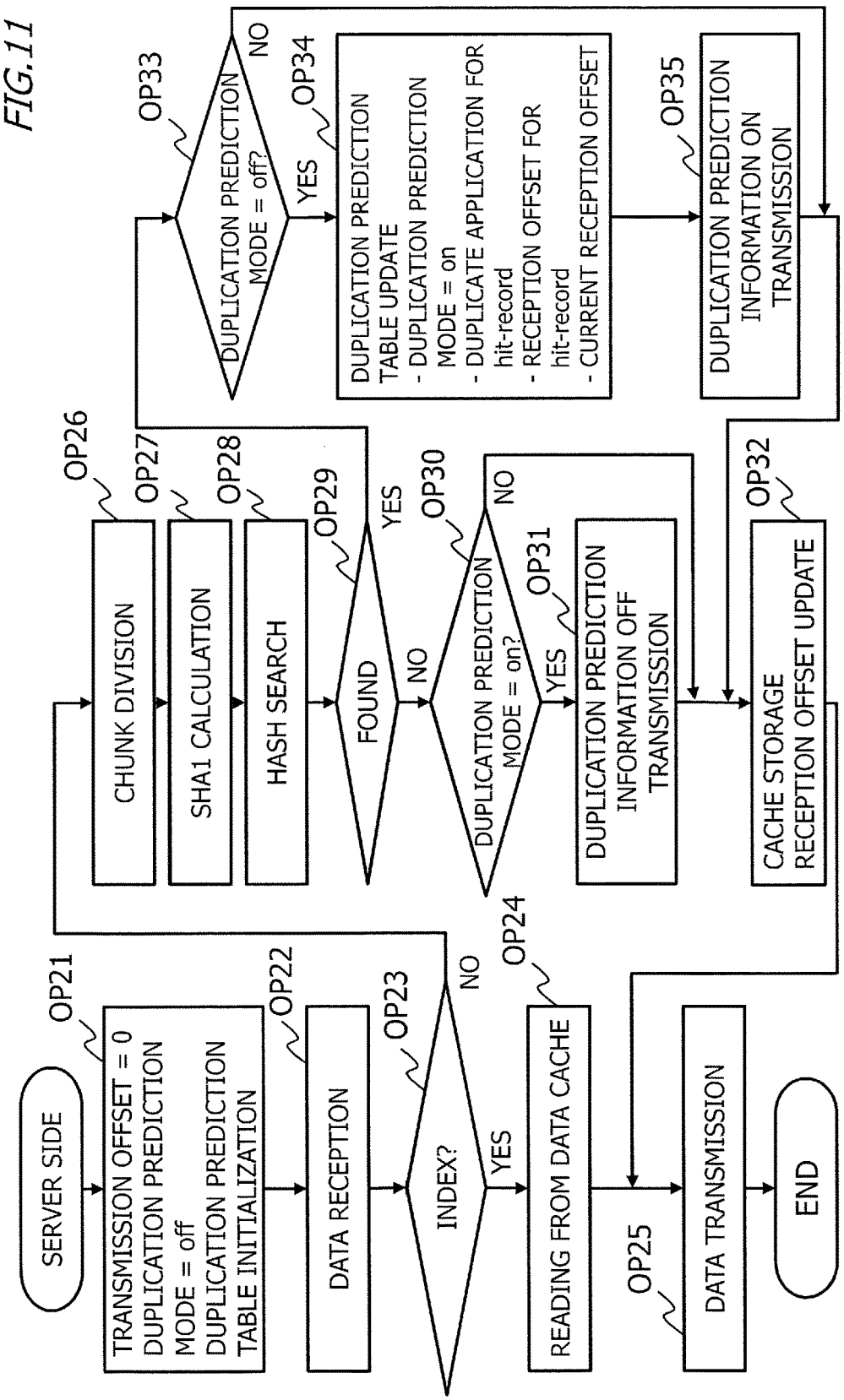

FIG.14

- PHYSICAL CHANNEL: bw(e.g. 10Mbps)
- CONVENTIONAL DUPLICATION REMOVAL SPEED OF TRANSMISSION-SIDE APPARATUS P1: dv(e.g. 10Mbps)
  DUPLICATION REMOVAL SPEED OF TRANSMISSION-SIDE APPARATUS 1: dw(e.g. 40Mbps)
- TRAFFIC DATA: X(e.g. 100Mbit)
- RATE OF TRAFFIC REDUCTION BY DUPLICATION REMOVAL: r: (e.g. If 90% overlap, 0.1)

TRANSFER TIME COMPARISON
(1) NO DUPLICATION REMOVAL = X/bw = 100/10 = 10
(2) DUPLICATION REMOVAL SYSTEM P100 ⇒ X/dv+X*r/bw = 100/10+100*0.1/10 = 11
(3) DUPLICATION REMOVAL SYSTEM 100 ⇒ X/dw+X*r/bw = 100/40+100*0.1/10 = $\boxed{3.5}$

SYSTEM AND APPARATUS FOR REMOVING DUPLICATE IN DATA TRANSMISSION

CROSS-REFERENCE TO RELATED APPLICATION

This application is a continuation of International Application PCT/JP2014/073379, filed on Sep. 4, 2014, and designated the U.S., the entire contents of which are incorporated herein by reference.

FIELD

The present invention relates to an information processing system, an information processing apparatus, an information processing method and an information processing program.

BACKGROUND

As one of methods for achieving an increase in speed of communication, there is a method in which a transfer data amount is reduced. The method in which a transfer data amount is reduced is effective for low-band channels because a used band can be reduced. Examples of the method in which a transfer data amount is reduced include a method in which data transmitted in duplicate is removed and a method in which data for transmission is compressed.

In the method in which data transmitted in duplicate is removed, for example, a system configuration in which a transmission-side apparatus and a reception-side apparatus are placed in a transmission-side network and a reception-side network, respectively, is often employed. The transmission-side apparatus and the reception-side apparatus each cache previously-processed data in advance, and the transmission-side apparatus checks if there is duplication of data for transmission, using cached data, and if there is duplication of data for transmission, transmits outline information on the data for transmission instead of the data for transmission. Upon reception of the outline information on the data, the reception-side apparatus reads the data from the cache and transfers the data to a destination. Since the outline information on the data for transmission is small in size compared to the data for transmission, the amount of data transferred can be reduced, enabling reduction of a band used between the transmission-side apparatus and the reception-side apparatus.

PATENT DOCUMENT

[Patent Document 1] Japanese Patent Laid-Open No. 2009-21906
[Patent Document 2] Japanese Patent Laid-Open No. 2001-331661
[Patent Document 3] Japanese Patent Laid-Open No. 2000-357121

However, data for transmission duplication determination processing is performed by the transmission-side apparatus, and thus provides a large load and generates overhead. If there is duplication of data for transmission, overhead generated by the data for transmission duplication determination processing is cancelled out by a used band reduction effect provided by data reduction. However, if there is no duplication of data for transmission, the data for transmission duplication determination processing generates considerable overhead.

SUMMARY

An aspect of the present invention provides an information processing system including a transmission-side apparatus and a reception-side apparatus. The reception-side apparatus includes a first storage unit that stores first data which has been received, a reception unit that receives data from the transmission-side apparatus, a duplication detection unit that determines whether or not data duplicating at least a part of the received data is stored in the first storage unit, and a notification unit that, when data duplicating at least a part of the received data is stored in the first storage unit, notifies the transmission-side apparatus of prediction information on duplicate reception of the first data. The transmission-side apparatus includes a second storage unit that stores the first data which has been transmitted, a determination unit that, when the prediction information on duplicate reception of the first data is received from the reception-side apparatus, compares transmission scheduled data and a part of the first data based on the prediction information on duplicate reception, and determines whether or not there is a part of the first data in the second storage unit, the part matching the transmission scheduled data, and a transmission unit that, when there is a part of the first data in the second storage unit, the part matching the transmission scheduled data, transmits outline information on the transmission scheduled data instead of the transmission scheduled data.

The object and advantages of the invention will be realized and attained by means of the elements and combinations particularly pointed out in the claims.

It is to be understood that both the foregoing general description and the following detailed description are exemplary and explanatory only and are not restrictive of the invention.

BRIEF DESCRIPTION OF DRAWINGS

FIG. 6 is a diagram illustrating an example of a data structure in a transmission-side cache;
FIG. 8 is a diagram illustrating an example of a data structure in a reception-side cache;
FIG. 9 is a diagram illustrating an example of duplication prediction information;
FIG. 10 is an example flowchart of processing in the transmission-side apparatus;
FIG. 11 is an example flowchart of processing in the reception-side apparatus;
FIG. 14 is a diagram illustrating effects of the data deduplication system according to the first embodiment.

DESCRIPTION OF EMBODIMENTS

An embodiment of the present invention will be described below with reference to the drawings. The configuration of the embodiment below is a mere example, and the present invention is not limited to the configuration of the embodiment.

<Example of Data Deduplication>

Figure 1:
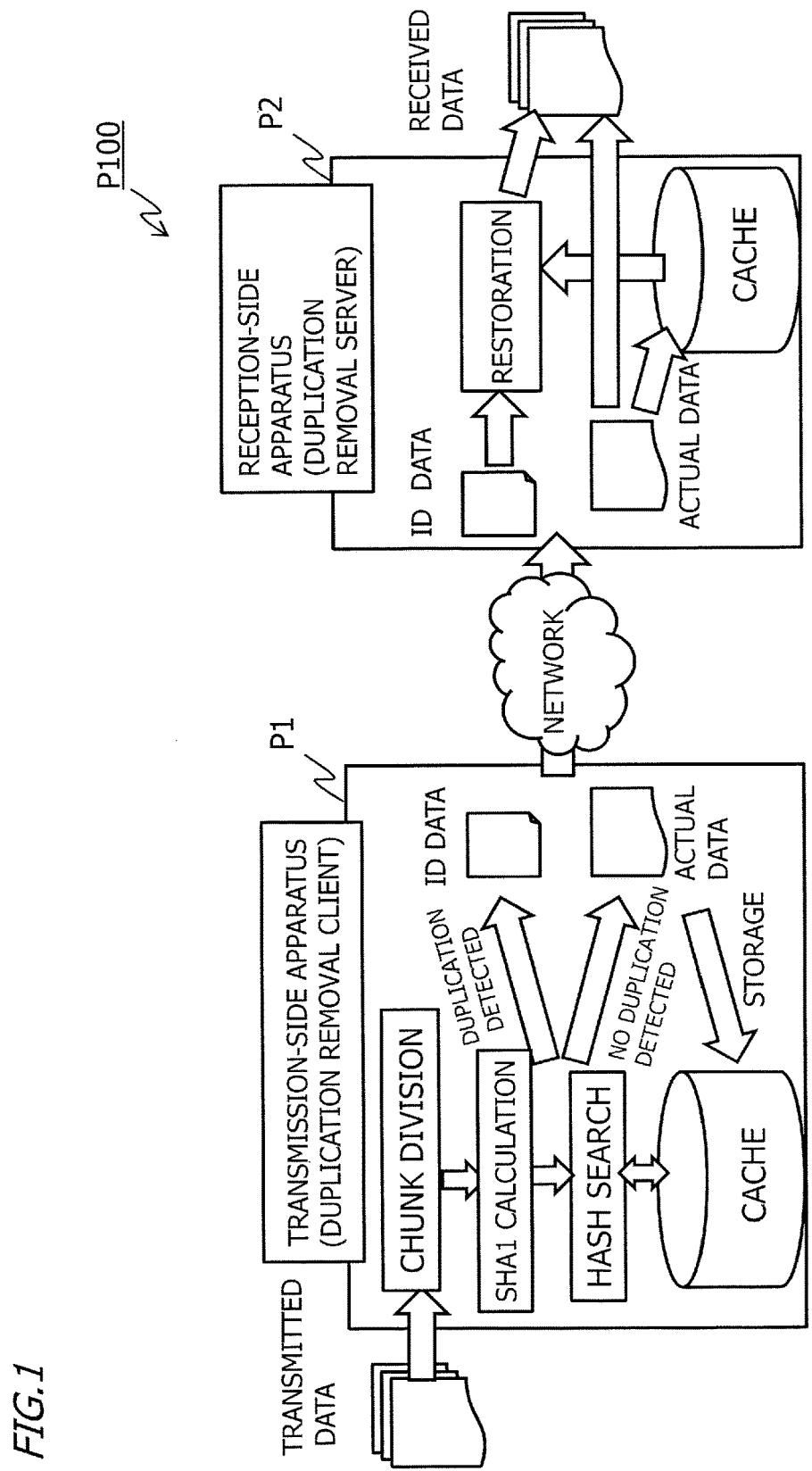
FIG. 1 is a diagram illustrating an example of a data deduplication system.

FIG. 1 is a diagram illustrating an example of a data deduplication system. The data deduplication system P100 includes a transmission-side apparatus P1 and a reception-side apparatus P2. Each of the transmission-side apparatus P1 and the reception-side apparatus P2 is, for example, an apparatus located at a boundary of a network.

For example, upon reception of data from an application, the transmission-side apparatus P1 divides the data into variable-length blocks of 1 to 4 KB, which are called "chunks". The transmission-side apparatus P1 calculate SHA1 (Secure Hash Algorithm) for each chunk to obtain a hash value, and perform a hash search inside a cache, using the hash value as a key. In the cache in the transmission-side apparatus P1, chunks of previously-transmitted data and SHA1 calculation results are retained.

As a result of the hash search, if no chunk that matches SHA1 calculation result is detected, that is, if there is no duplication of the chunk, the transmission-side apparatus P1 stores the chunk in the cache and transmits the actual data. As a result of the hash search, if a chunk that matches SHA1 calculation result is detected, that is, if there is duplication of the chunk, the transmission-side apparatus P1 transmits ID data of the chunk. The ID data of the chunk includes, for example, an application ID, position information of the chunk, and a size of the chunk.

If the reception-side apparatus P2 receives the actual data, the reception-side apparatus P2 transfers the actual data to a destination and stores the actual data in a cache. If the reception-side apparatus P2 receives the ID of the chunk, the reception-side apparatus P2 reads relevant actual data from the cache, restores the data and transmits the data to the destination.

In the data deduplication system P100 illustrated in FIG. 1, the transmission-side apparatus perform processing for chunk division, SHA1 calculation and hash search, and if there is duplication of a chunk, transmits ID data of the chunk, thereby reducing an amount of data transferred. However, a load of processing for chuck division, SHA1 calculation and hash search is large, and thus, for example, if the transmission-side apparatus P1 is a relatively low-performance apparatus such as a terminal apparatus, the data deduplication processing may make no contribution to an increase in speed of communication.

First Embodiment

Figure 2:
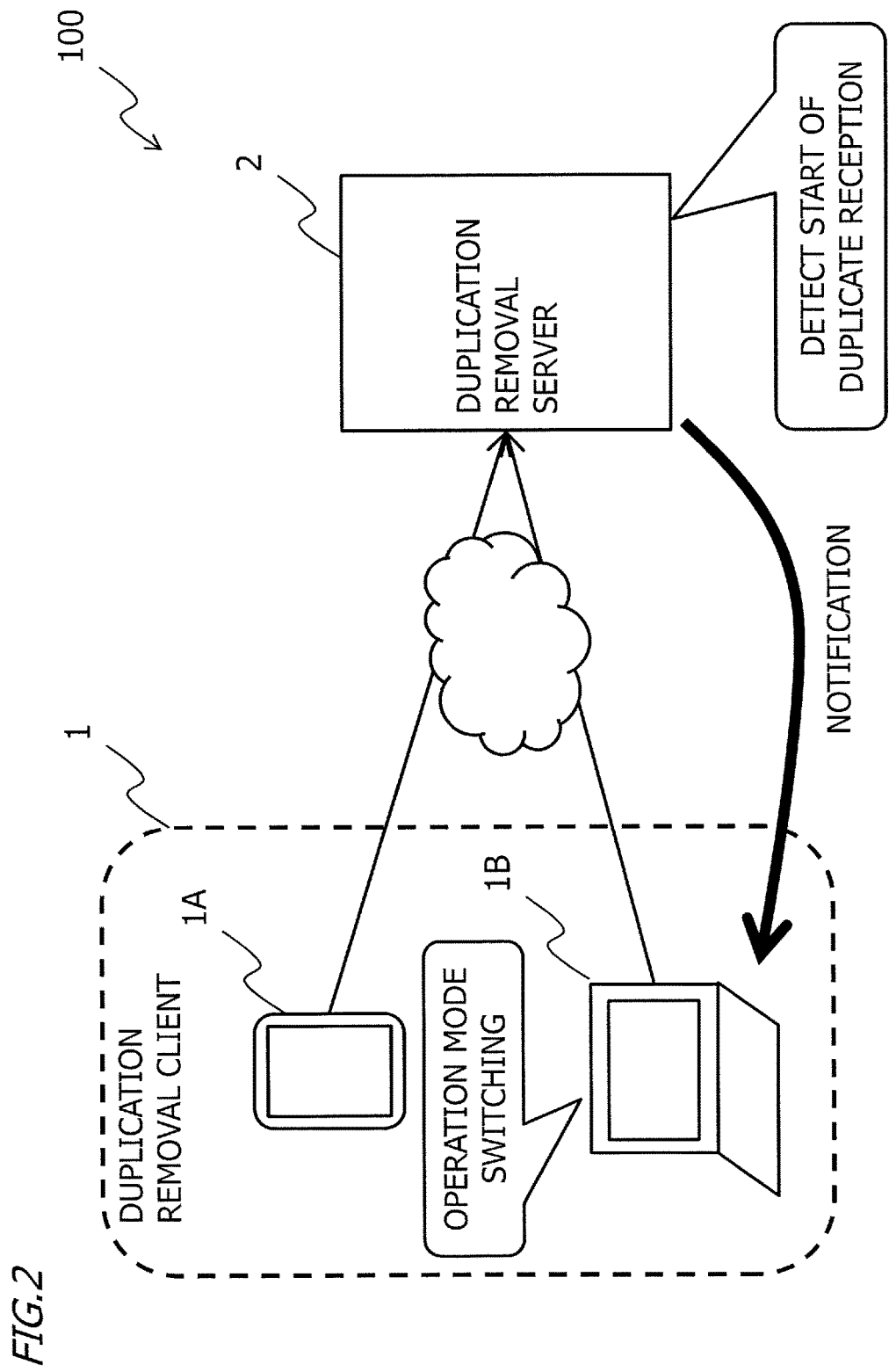
FIG. 2 is a diagram illustrating an example of a configuration of a data deduplication system according to a first embodiment.

FIG. 2 is a diagram illustrating a configuration of a data deduplication system 100 according to a first embodiment. For example, the data deduplication system 100 includes deduplication clients 1 and a deduplication server 2. The deduplication clients 1 are, for example, terminal apparatuses such as a smart phone 1A and a PC (personal computer) 1B. Also, the deduplication clients 1 may be special-purpose computers such as servers. The deduplication clients 1 are also referred to as transmission-side apparatuses 1. The deduplication server 2 is also referred to as a reception-side apparatus 2.

In the first embodiment, the reception-side apparatus 2 caches data previously received from the transmission-side apparatuses 1, and detects a start of duplication of received data using the cache. Upon detection of a start of duplication of received data, the reception-side apparatus 2 notifies the relevant transmission-side apparatus 1 of duplication prediction information. Upon reception of the duplication prediction information from the reception-side apparatus 2, the transmission-side apparatus 1 switches operation modes to perform duplication determination processing using memory comparison, which causes a relatively low load, for transmission scheduled data to be transmitted, based on the duplication prediction information, and transmits the resulting data.

Figure 3:
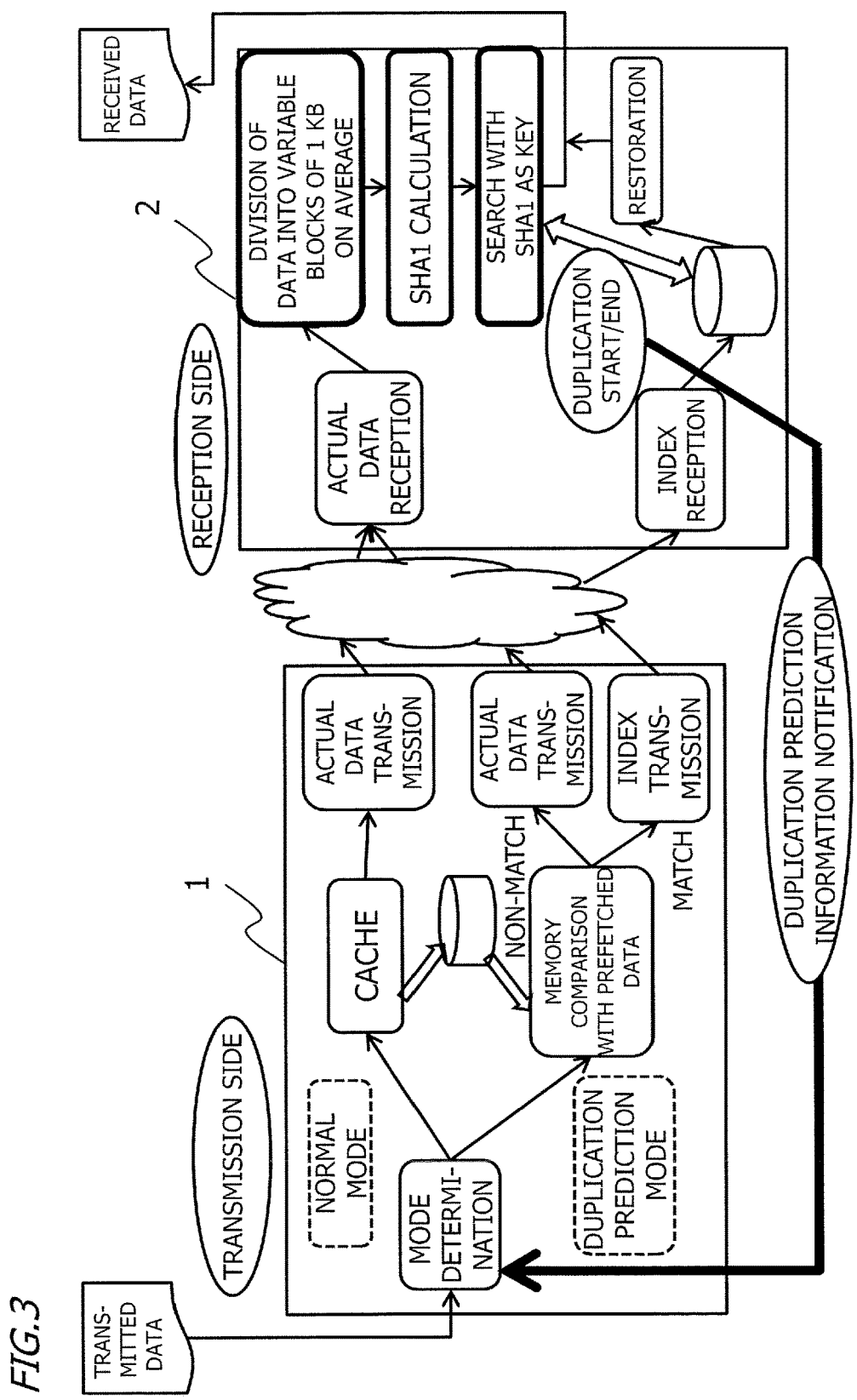
FIG. 3 is a diagram illustrating an example of processing in the first embodiment.

FIG. 3 is a diagram illustrating an example of processing in the first embodiment. A transmission-side apparatus 1 has two operation modes, a normal mode and a duplication prediction mode. In the normal mode, the transmission-side apparatus 1 stores transmission scheduled data to be transmitted in a cache and transmits the actual data.

Upon reception of notification of duplication prediction information from the reception-side apparatus 2, the operation mode of the transmission-side apparatus 1 is switched to the duplication prediction mode. In the duplication prediction mode, the transmission-side apparatus 1 prefetches partial data from cache data based on the duplication prediction information, and performs comparison between the data to be transmitted and a memory to determine whether or not there is duplication. If the partial data and the data to be transmitted do not match each other, the data to be transmitted is not duplicate data, and thus, the transmission-side apparatus 1 transmits the actual data. If the partial data and the data to be transmitted match each other, there is duplication of the data to be transmitted and the transmission-side apparatus 1 thus transmits an index of the data to be transmitted.

If the actual data is received, the reception-side apparatus 2 divides the actual data into chunks, calculates SHA1 for each chunk and performs search the cache using a result of the SHA1 calculation as a key. If a duplicate chunk is detected in the cache, the reception-side apparatus 2 detects a start of duplicate reception, generates duplication prediction information and notifies the transmission-side apparatus 1 of the duplication prediction information.

If the reception-side apparatus 2 receives the index, the reception-side apparatus 2 reads the chunk indicated by the index from the cache, restores the data and transmits the data to a destination apparatus.

In the first embodiment, the reception-side apparatus 2 performs high-load processing such as chunk division, SHA1 calculation and hash search, and the transmission-side apparatus 1 performs relatively low-load processing such as comparison between prefetched data and data to be transmitted. Consequently, the processing load on transmission-side apparatus 1 can be reduced.

<Apparatus Configuration>
<Transmission-Side Apparatus>

Figure 4:
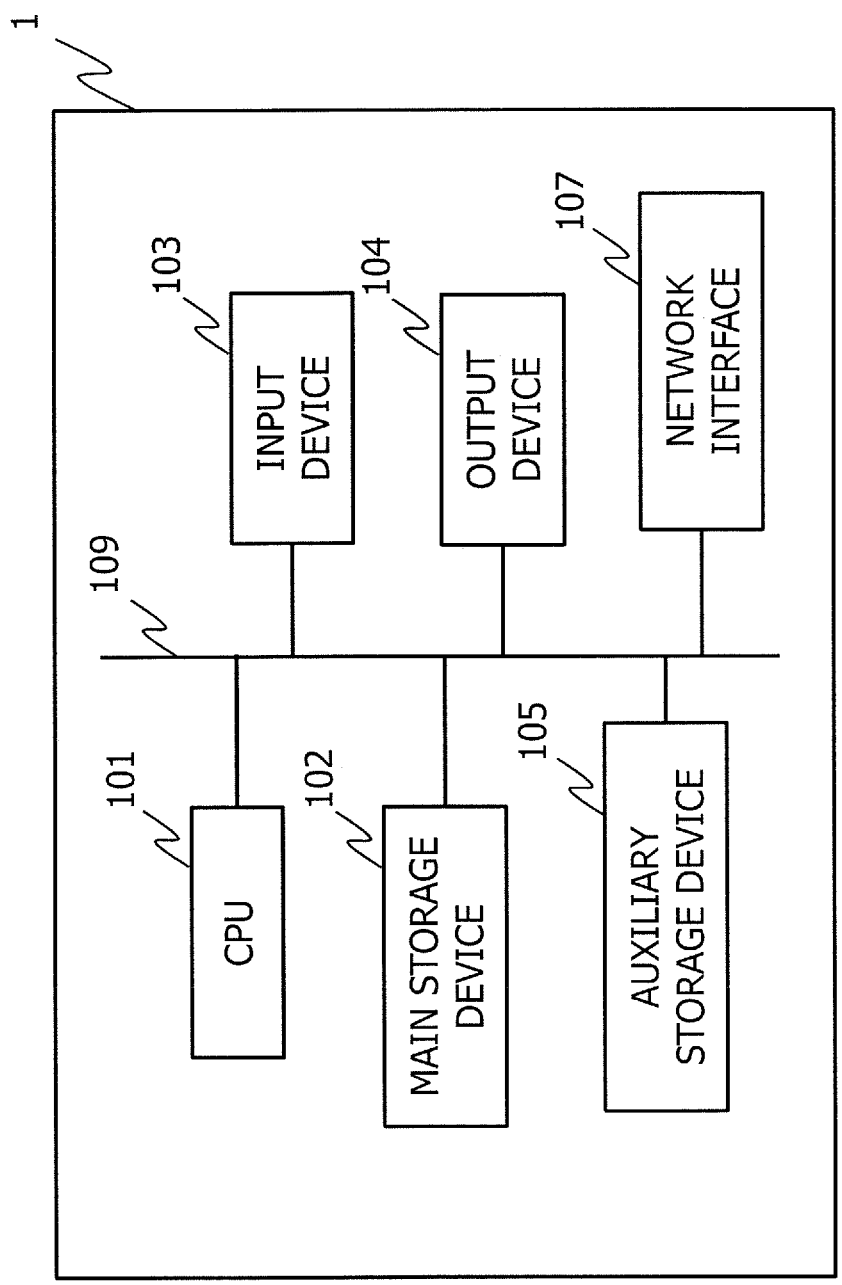
FIG. 4 is a diagram illustrating an example of a hardware configuration of a transmission-side apparatus.

FIG. 4 is a diagram illustrating an example of a hardware configuration of a transmission-side apparatus 1. The transmission-side apparatus 1 is, for example, a mobile phone terminal, a smart phone, a tablet terminal or a general-purpose or special-purpose computer.

The transmission-side apparatus 1 includes a CPU (central processing unit) 101, a main storage device 102, an input device 103, an output device 104, an auxiliary storage device 105 and a network interface 107. Also, these components are interconnected via a bus 109.

The input device 103 includes, for example, an operation button, a touch panel, a keyboard and/or a keypad. Data input from the input device 103 is output to the CPU 101. The input device may also include, for example, a sound-input device such as a microphone.

The auxiliary storage device 105 stores various programs, and data to be used by the CPU 101 for execution of each program. The auxiliary storage device 105 is, for example, a non-volatile memory such as an EPROM (erasable programmable ROM), a flash memory or a hard disk drive. The auxiliary storage device 105 retains, for example, an operating system (OS), a deduplication client program and various other application programs. The deduplication client program is a program for making the transmission-side apparatus 1 operate as a deduplication client.

The main storage device 102 provides a storage area or a work area in which a program stored in the auxiliary storage device 105 is to be loaded, to the CPU 101, or is used as a buffer. The main storage device 102 includes, for example, a semiconductor memory such as a ROM (read-only memory) or a RAM (random access memory).

The CPU 101 loads the OS and various application programs retained in the auxiliary storage device 105 into the main storage device 102 and executes the OS and various application programs, and thereby performs various processing. The present invention is not limited to the case where a single CPU 101 is provided, and a plurality of CPUs 101 may be provided.

The network interface 107 is an interface via which information is input/output from/to a network. The network interface 107 includes an interface for connection with a wired network and an interface for connection with a wireless network. The network interface 107 is, for example, an NIC (network interface card) or a wireless LAN (local area network) card. Data or the like received by the network interface 107 is output to the CPU 101.

The output device 104 outputs a result of processing in the CPU 101. The output device 104 includes a sound-output device such as a speaker, a display and/or a printer.

Here, the hardware configuration of the transmission-side apparatus 1 illustrated in FIG. 4 is a mere example, and a hardware configuration of a transmission-side apparatus 1 in the present invention is not limited to the above, and omission, replacement and addition of components are possible as appropriate depending on the embodiment. For example, the transmission-side apparatus 1 may include a removable recording medium drive device, and execute a program recorded in a removable recording medium. The removable recording medium is, for example, a recording medium such as an SD card, a miniSD card, a microSD card, a USB (universal serial bus) flash memory, a CD (compact disc), a DVD (digital versatile disc), a Blu-ray (registered trademark) disc or a flash memory card.

Also, if the transmission-side apparatus 1 is a server, for example, the transmission-side apparatus 1 may include neither the input device 103 nor the output device 104.

Figure 5:
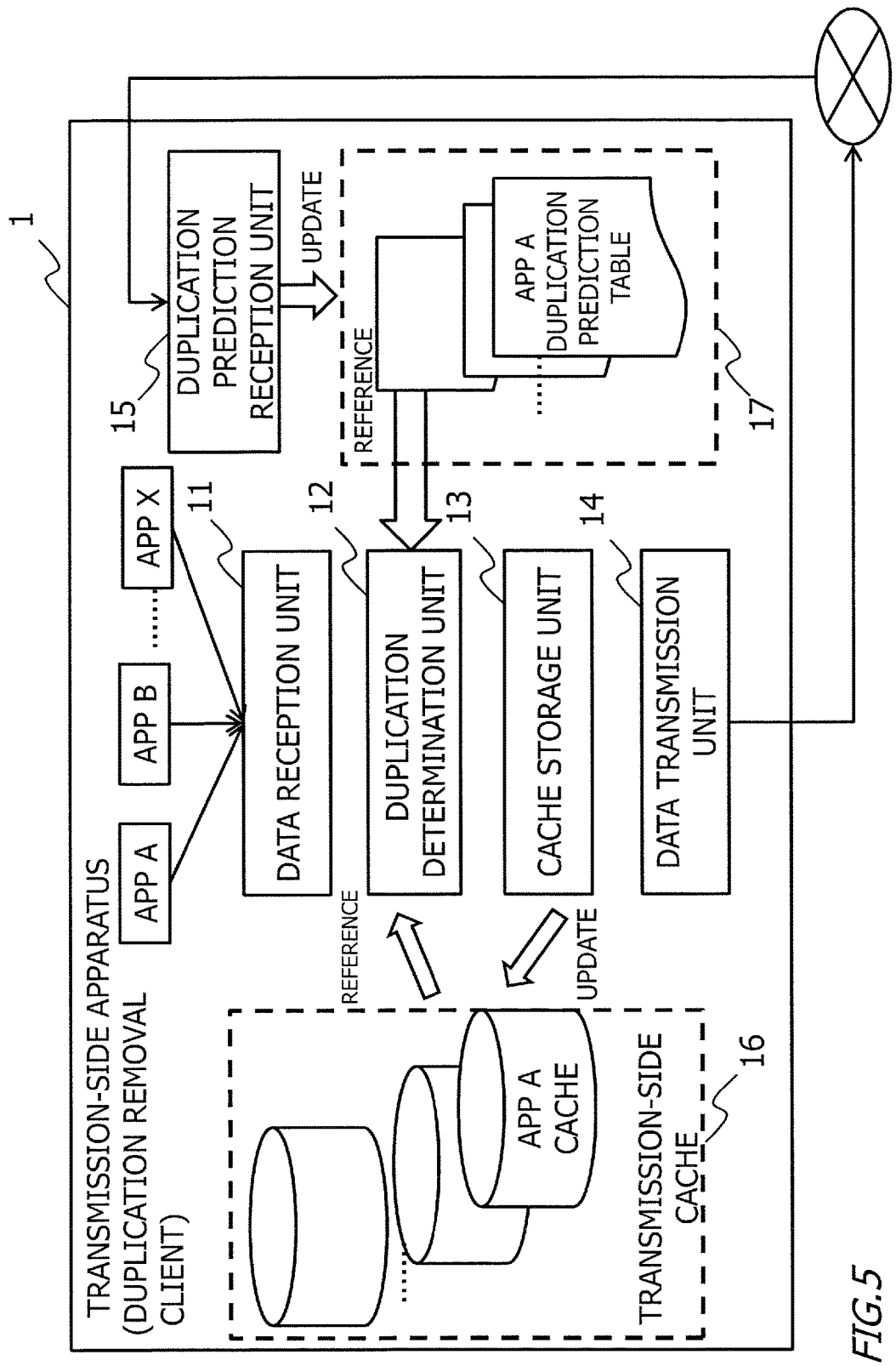
FIG. 5 is a diagram illustrating functional components of the transmission-side apparatus.

FIG. 5 is a diagram illustrating an example of functional components of the transmission-side apparatus 1. The transmission-side apparatus 1 includes a data reception unit 11, a duplication determination unit 12, a cache storage unit 13, a data transmission unit 14 and a duplication prediction reception unit 15, as functional components. These functional components are provided by the CPU 101 execution of the deduplication client program stored in the auxiliary storage device 105. Also, as a result of execution of the deduplication client program, an area for a transmission-side cache 16 is secured in a storage area of the auxiliary storage device 105. Also, an area for storing duplication prediction tables 17 is secured in the storage area of the main storage device 102. The deduplication client program is, for example, a program on the application layer.

The data reception unit 11 receives data from an application that is a source of the data, and terminates a session for the application. For example, if the application that is a source of the data is an application that performs communication according to TCP (transmission control protocol), upon reception of a connection request from the source of data, the data reception unit 11 establishes a TCP session with the source of the data. The data reception unit 11 performs communication with the source of data, using a socket that is a combination of an IP address and a port number. Therefore, the data reception unit 11 can identify the application from the socket.

Here, an entity that executes the application that is the source of the data may be the transmission-side apparatus 1 itself or may be another apparatus. For example, if the transmission-side apparatus 1 is a server, the entity that executes the application that is the source of the data is another apparatus and the data reception unit 11 receives data from the other apparatus through the network interface 107. For example, if the transmission-side apparatus 1 is a terminal apparatus, the entity that executes the application that is the source of the data is the transmission-side apparatus 1 itself. In the first embodiment, hereinafter, an entity that executes an application that is a source of data is not specified and simply referred to as "source".

If the operation mode is the normal mode, the data reception unit 11 outputs data to be transmitted, to the data transmission unit 14. The data to be transmitted is data received from the source application. If the operation mode is the duplication prediction mode, the data reception unit 11 outputs data to be transmitted, to the duplication determination unit 12.

The data reception unit 11 holds, for example, a processing buffer of a predetermined size. The data received from the source application is processed in units of the size of the processing buffer in the transmission-side apparatus 1. The size of the processing buffer is, for example, 50 to 100 KB. However, the size of the processing buffer is not limited to this example. In other words, the data to be transmitted is a data block of a size that is the same as or smaller than that of the processing buffer.

Also, the data reception unit 11 monitors an offset of data to be transmitted from a start of communication with the source application. The offset of the data to be transmitted from a start of communication with the source application is a value indicating a position of a head of the data to be transmitted. For example, the offset is a value that is zero-based and increments by one per byte in a size of data. For example, after a start of communication, if a size of first data to be transmitted is 80 KB, an offset of the first data to be transmitted is 0, and an offset of next data to be transmitted is 80000.

If the operation mode is the duplication prediction mode, data to be transmitted is input from the data reception unit 11 to the duplication determination unit 12. Here, an initial value of the operation mode is the normal mode. Referring to a duplication prediction table 17 for an application for the data to be transmitted, the duplication determination unit 12 prefetches relevant partial data on the application, which is indicated in the duplication prediction table 17, from the transmission-side cache 16, and compares the relevant partial data with the data to be transmitted. Here, the application for the data to be transmitted and the application indicated in the duplication prediction table 17 match each other in some cases and do not match each other in other cases. Details of a method of obtaining the partial data will be described later.

If the partial data and the data to be transmitted do not match each other, the duplication determination unit 12 determines that the data to be transmitted is non-duplicate, new data. In this case, the duplication determination unit 12 outputs the data to be transmitted itself to the cache storage unit 13 and the data transmission unit 14.

If the partial data and the data to be transmitted match each other, the duplication determination unit 12 determines that the data to be transmitted is data to be transmitted in duplicate. Partial data that match data to be transmitted is referred to as duplicate data. If there is duplicate data, the duplication determination unit 12 outputs an index of the data to be transmitted, to the data transmission unit 14. The duplication determination unit 12 is an example of "determination unit".

The index of the data to be transmitted includes, for example, a flag indicating an index, identification information for the application for the data to be transmitted, the offset of the data to be transmitted from the start of communication, identification information for the application for the duplicate data, an offset of the duplicate data in a transmission-side cache 16 for the application for the duplicate data, and the size of the data to be transmitted. Also, the offset of the duplicate data is obtained from the transmission-side cache 16 for the relevant application. The index of the data to be transmitted is an example of "outline information on data to be transmitted".

If the data to be transmitted is new data, the cache storage unit 13 receives an input of the data to be transmitted, from the duplication determination unit 12. The cache storage unit 13 adds the data to be transmitted to a tail end of data stored in a transmission-side cache 16 for the application for the data to be transmitted.

The data transmission unit 14, for example, transfers a connection request from the data source, to the reception-side apparatus 2, and establishes a TCP session with the reception-side apparatus 2. The data transmission unit 14 transmits inputted data using the session, to the reception-side apparatus 2.

For example, if the data transmission unit 14 receives the input of the data to be transmitted itself from the duplication determination unit 12, the data transmission unit 14 transmits the data to be transmitted, to the reception-side apparatus 2. For example, if the data transmission unit 14 receives the input of the index of the data to be transmitted from the duplication determination unit 12, the data transmission unit 14 transmits the index of the data to be transmitted, to the reception-side apparatus 2. The data transmitted from the data transmission unit 14 is affixed with the identification information for the application and information on an original destination of the data, that is, information on a socket. The data transmission unit 14 is an example of "transmission unit".

The duplication prediction reception unit 15 receives duplication prediction information from the reception-side apparatus 2. The duplication prediction reception unit 15 uses the session that is the same as that of the data transmission unit 14. The duplication prediction reception unit 15 reflects the received duplication prediction information in the duplication prediction table 17 for the relevant application.

The duplication prediction table 17 is stored in, for example, the storage area of the main storage device 102. The information included in the duplication prediction table 17 is the same as information included in the duplication prediction information. The duplication prediction table 17 is overwritten by new duplication prediction information received by the duplication prediction reception unit 15. Details of the duplication prediction table 17 and the duplication prediction information will be described later.

FIG. 6 is a diagram illustrating an example of a data structure in a transmission-side cache 16. A transmission-side cache 16 is created in the storage area of the auxiliary storage device 105, for each application. For example, upon reception of an input of data to be transmitted on a new application, the cache storage unit 13 creates a transmission-side cache 16 for the new application in a storage area secured for the transmission-side cache 16 in the auxiliary storage device 105.

A transmission-side cache 16 includes a transmission offset and transmitted data for previously-transmitted data. The transmitted data is a data block of a size that is the same as or smaller than the size of the processing buffer in the data reception unit 11. The transmission offset indicates a head position of a data block in the transmission-side cache 16 for the relevant application for the data. For example, if the offset is zero-based and data of 80 KB is already stored in the transmission-side cache 16 for the relevant application, an offset of newly-stored data is 80000. An offset of duplicate data included in an index of data to be transmitted is a transmission offset of the relevant data in the relevant transmission-side cache 16. The transmission-side cache 16 is an example of "second storage unit".

<Reception-Side Apparatus>

The reception-side apparatus 2 is, for example, a special-purpose server. A hardware configuration of the reception-side apparatus 2 is similar to the hardware configuration of the transmission-side apparatus 1, and thus illustration thereof will be omitted. In other words, the reception-side apparatus 2 includes a CPU, a main storage device, an auxiliary storage device and a network interface. Also, the reception-side apparatus 2 may include, e.g., an input device, an output device and a removable recording medium drive device.

In the auxiliary storage device of the reception-side apparatus 2, an OS, a deduplication server program and other applications are stored. The deduplication server program is a program for causing the reception-side apparatus 2 to function as a deduplication server.

Figure 7:
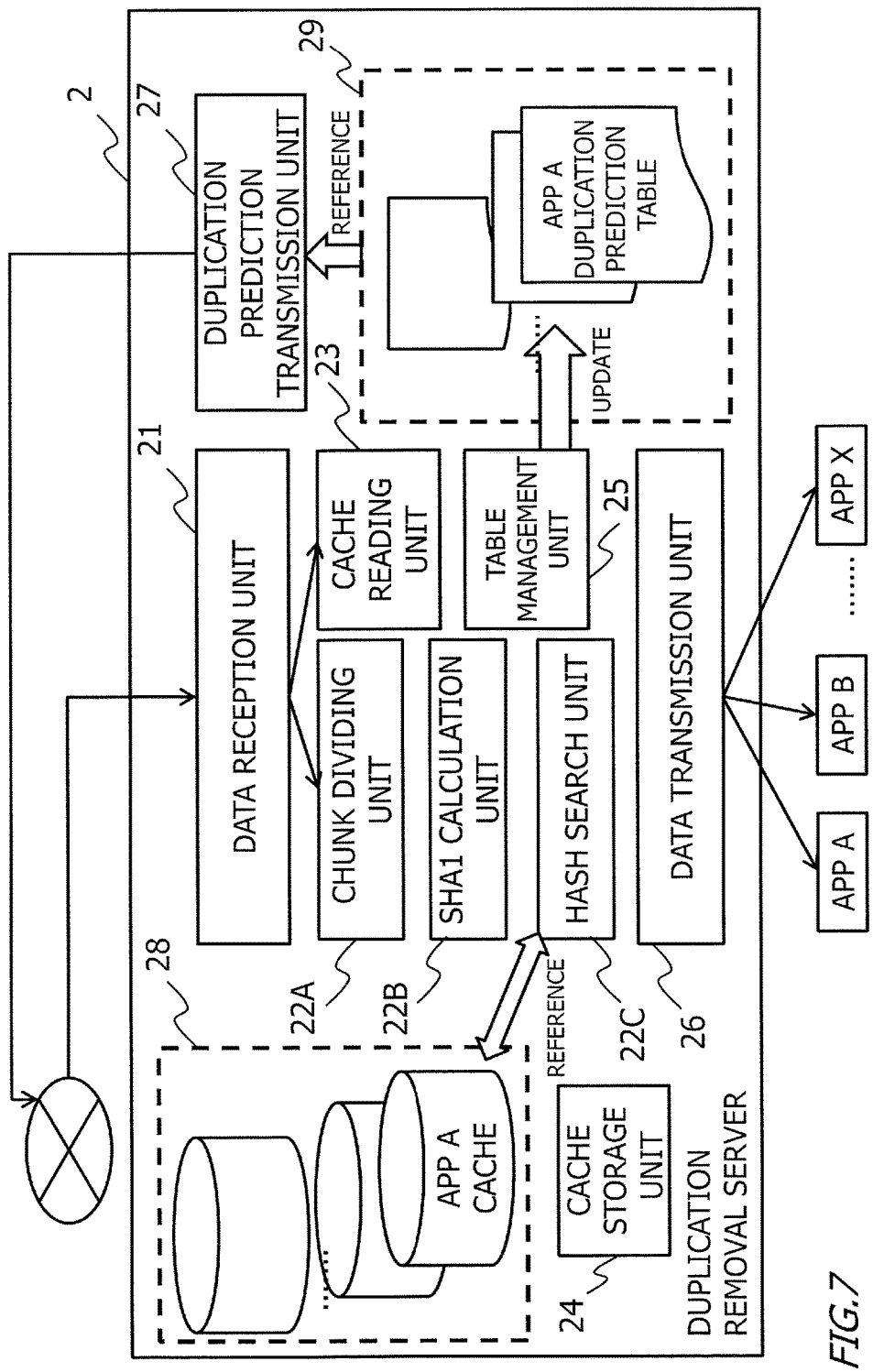
FIG. 7 is a diagram illustrating functional components of a reception-side apparatus.

FIG. 7 is a diagram illustrating an example of functional components of the reception-side apparatus 2. The reception-side apparatus 2 includes a data reception unit 21, a chunk dividing unit 22A, a SHA1 calculation unit 22B, a hash search unit 22C, a cache reading unit 23, a cache storage unit 24, a table management unit 25, a data transmission unit 26 and a duplication prediction transmission unit 27, as functional components. These functional components are ones provided by, for example, execution of a deduplication server program stored in the auxiliary storage device by the CPU. Also, as a result of execution of the deduplication server program, an area for reception-side caches 28 is secured in a storage area of the auxiliary storage device. Also, in a storage area of the main storage device, an area for storing a duplication prediction table is secured. Here, the deduplication server program is, for example, a program on the application layer.

The data reception unit 21, for example, upon reception of a connection request from the transmission-side apparatus 1, establishes a TCP session and receives data through the TCP session. If the received data is actual data, the data reception unit 21 outputs the received data to the chunk dividing unit 22A. If the received data is an index, the data reception unit 21 outputs the received data to the cache reading unit 23. For example, the index includes a flag indicating that the received data is an index, and the data reception unit 21 determines that the received data is an index, from the flag.

Here, the data reception unit 21 holds a processing buffer of a predetermined size, and the received data is processed in units of the size of the processing buffer in the reception-side apparatus 2. The size of the processing buffer is, for example, 50 to 100 KB. However, the size of the processing buffer is not limited to this example. Also, the data reception unit 21 monitors an offset of received data from a start of reception, for each application for received data. The data reception unit 21 is an example of "reception unit".

The chunk dividing unit 22A divides the received data into chunks. A size of the chunks is determined according to a predetermined algorithm. The chunk dividing unit 22A outputs a plurality of chunks created from the received data to the SHA1 calculation unit 22B. The chunk dividing unit 22A is an example of "dividing unit".

The SHA1 calculation unit 22B calculates SHA1 for each of the plurality of chunks created from the received data. The SHA1 calculation unit 22B outputs a result of the calculation of SHA1 of each chunk to the hash search unit 22C. The SHA1 calculation unit 22B is an example of "calculation unit".

The hash search unit 22C searches the reception-side caches 28 for all the applications, using the result of the calculation of SHA1 of each chunk (hash value) as a key. The hash search unit 22C outputs a result of the search to the cache storage unit 24 and the table management unit 25. The hash search unit 22C is an example of "search unit". The chunk dividing unit 22A, the SHA1 calculation unit 22B and the hash search unit 22C collectively form an example of "duplication detection unit".

If at least one of the chucks of the received data which match SHA1 calculation result is detected in the reception-side caches 28, the table management unit 25 overwrites and thereby updates a duplication prediction table 29 for the application of the received data. An example of the update in this case is a change of the operation mode to the duplication prediction mode.

If there is no chunk of the received data which matches SHA1 calculation result in the reception-side caches 28, the table management unit 25 does not update the duplication prediction table 29 for the application of the received data.

The cache storage unit 24 adds new chunks of the received data to a tail end in the reception-side cache 28 for the relevant application. Here, all of the chucks of the received data may be new data, and some of the chunks may be new data.

The cache reading unit 23 receives an input of an index from the data reception unit 21. The cache reading unit 23 reads relevant chunks from the reception-side cache 28 for the relevant application based on information in the index, restores data and outputs the data to the data transmission unit 26. The cache reading unit 23 is an example of "transfer unit".

The data transmission unit 26 transmits the received data or the restored data to a destination application. The data transmission unit 26 transfers a connection request received from the transmission-side apparatus 1 to the destination, establishes, for example, a TCP session with the destination application, and transmits the data through the TCP session. The destination application may be present in the reception-side apparatus 2 or may be present in another apparatus. In the first embodiment, an entity that executes the destination application is not specified and is simply referred to as "destination". The data transmission unit 26 is an example of "transmission unit".

If a duplication prediction table is created or updated, the duplication prediction transmission unit 27 transmits the duplication prediction table to the transmission-side apparatus 1 as duplication prediction information. The duplication prediction transmission unit 27 is an example of "transmission unit".

FIG. 8 is a diagram illustrating an example of a data structure of a reception-side cache 28. The reception-side cache 28 is prepared for, for example, each application. In the reception-side cache 28, a hash value, an application ID, a reception offset and received data are stored for each chunk. The hash value is a value of an SHA1 calculation result. The reception offset is a position of a head of the relevant chunk in the application. The reception-side cache is an example of "first storage unit".

FIG. 9 is a diagram illustrating an example of duplication prediction information. As described above, a format of the duplication prediction tables 17 retained in the transmission-side apparatus 1 and a format of the duplication prediction tables 29 retained in the reception-side apparatus 2 are the same, and are similar to a format of duplication prediction information. The duplication prediction tables 29 in the reception-side apparatus 2 are created and updated by the table management unit 25 of the reception-side apparatus 2.

Duplication prediction information includes, for example, entries of current application type, duplication prediction mode, duplicate application type, current application duplication start position, duplicate application start position and predicted duplication length.

In the current application type entry, identification information on an application for received data in the reception-side apparatus 2 is stored. In the duplication prediction mode entry, either "on" or "off" is set. Setting of "on" in the duplication prediction mode entry indicates that the duplication prediction mode is designated as the operation mode of the transmission-side apparatus 1. Setting of "off" in the duplication prediction mode entry indicates that the normal mode is designated as the operation mode of the transmission-side apparatus 1.

In the duplicate application type entry, identification information on an application for a chuck in a reception-side cache 28, the chuck duplicating a chunk of the received data in the reception-side apparatus 2 is stored. Since same data may be used by different applications, an application for the received data and an application for a cache in which the data duplicating the received data is stored are not always match each other. Hereinafter, an application for a cache that stores data duplicating received data or data to be transmitted is referred to as duplicate application.

In the current application duplication start position entry, an offset of the chunk of the received data, from which duplication has been detected, from a start of communication with the application for the received data in the reception-side apparatus 2 is stored. A value stored in the current application duplication start position entry is obtained from, for example, the data reception unit 21.

In the duplicate application duplication start position entry, a reception offset of the chunk in the reception-side cache 28 for the duplicate application, the chunk matching a chunk of the received data, is stored. A value stored in the duplicate application duplication start position entry is obtained from the reception-side cache 28 for the duplicate application.

In the predicted duplication length entry, a predicted data length of data to be received in duplicate is stored. A value stored in the predicted duplication length entry is, for example, a value obtained by subtraction of the reception offset of the chunk that matches the chunk of the received data from an amount of data stored in the reception-side cache 28 for the duplicate application.

The duplicate application type, current application duplication start position, duplicate application duplication start position and predicted duplication length entries are invalid if the value of the duplication prediction mode entry is not "on". The format of duplication prediction information illustrated in FIG. 9 is a mere example, and the format is not limited to this example. For example, it is possible that duplication prediction information does not include the predicted duplication length entry.

For example, duplication prediction information created in the case where it is detected that a chunk of received data, the chunk having an offset of 80000 from a start of communication with application A, duplicates a chunk having a reception offset of 100000 in a reception-side cache for application B is as follows. Here, the predicted duplication length entry is omitted in the below duplication prediction information.

(Created Duplication Prediction Information)
  Application type: Application A
  Duplication prediction mode: on
  Duplicate application type: Application B
  Current application duplication start position: 80000
  Duplicate application duplication start position: 100000

Next, if the transmission-side apparatus 1 transmits data to be transmitted, the data having an offset of 90000 from the start of communication with application A, after reception of the above duplication prediction information, for example, the following processing is performed. The duplication determination unit 12 refers to a duplication prediction table 17 in which the application type entry indicates application A and also refers to a transmission-side cache 16 for application B indicated by the duplicate application type entry.

The duplication determination unit 12 reads partial data from the transmission-side cache 16 for application B based on the duplication prediction table 17 and performs comparison between the partial data and the data to be transmitted. The partial data is data having a reception offset of a value obtained by addition of a value resulting from subtraction of a value in the current application duplication start position entry from the offset of the data to be transmitted from the start of communication with application A, to a value in the duplicate application duplication start position entry. In this case, a reception offset of the partial data=duplicate application duplication start position 100000+(90000−80000)=110000.

If the data to be transmitted on application A and the partial data on application B match each other, the data transmission unit 14 of the transmission-side apparatus 1 transmits an index of the data to be transmitted. The index of the data to be transmitted includes the following information.

(Information in Index of Data to be Transmitted)
  Index flag: on
  Current application type: Application A
  Current application transmission offset: 90000
  Duplicate application type: Application B
  Duplicate application offset: 110000
  Data length: 80 KB Upon reception of the index of the data to be transmitted by the reception-side apparatus 2, the cache reading unit 23 performs processing based on the information included in the index. More specifically, the cache reading unit 23 reads chunks included in offsets of 110000 to 190000 from the reception-side cache 28 for application B and restores data.

<Flow of Processing>

FIG. 10 is an example of a flowchart of processing in the transmission-side apparatus 1. The processing indicated in FIG. 10 is started, for example, upon establishment of a TCP session with a data source application.

In OP1, the cache storage unit 13 performs initialization by setting a transmission offset in a transmission-side cache 16 for an application with which a session is established, to 0. Also, the duplication prediction reception unit 15 initializes the relevant duplication prediction table 17. Next, the processing proceeds to OP2.

In OP2, the transmission-side apparatus 1 receives data. If the received data is duplication prediction information (OP3: YES), the processing proceeds to OP4. If the received data is not duplication prediction information (OP3: NO), that is, the received data is data to be transmitted from the application, the processing proceeds to OP5.

In OP4, the duplication prediction reception unit 15 has received duplication prediction information, and thus, copies the duplication prediction information to the duplication prediction table 17. Subsequently, the processing indicated in FIG. 10 ends. If the transmission-side apparatus 1 receives data next, the processing starts from OP2.

In OP5, referring to the duplication prediction table 17, the data reception unit 11 determines whether or not the operation mode is the duplication prediction mode. The data reception unit 11 performs socket communication with the source application, and thus can obtain identification information on the application for the received data and refers to the duplication prediction table 17 for the application for the received data.

If the operation mode is the duplication prediction mode (OP5: YES), the processing proceeds to OP6. If the operation mode is not the duplication prediction mode (OP5: NO), the processing proceeds to OP9.

OP6 to OP9 indicate processing where the operation mode is the duplication prediction mode. In OP6, the duplication determination unit 12 reads partial data to be compared with the data to be transmitted, from the transmission-side cache 16 for the duplicate application, based on the duplication prediction table 17. A method for reading the partial data is as described above. Next, the processing proceeds to OP7.

In OP7, the duplication determination unit 12 compares the data to be transmitted and the partial data in terms of memory, and determines whether or not there is duplication. If the data to be transmitted and the partial data match each other (OP7: YES), the processing proceeds to OP8. If the data to be transmitted and the partial data do not match each other (OP7: NO), the processing proceeds to OP9.

In OP8, the data to be transmitted and the partial data match each other, and thus, the data transmission unit 14 transmits an index of the data to be transmitted to the reception-side apparatus 2. Subsequently, the processing indicated in FIG. 10 ends, and if data is received from the same application next, the processing starts from OP2.

OP9 to OP11 indicate processing where the operation mode is the normal mode and where the operation mode is the duplication prediction mode and the data to be transmitted and the partial data do not match each other. In OP9, the cache storage unit 13 stores the data to be transmitted into the transmission-side cache 16 for the relevant application. Next, the processing proceeds to OP10.

In OP10, the cache storage unit 13 updates a transmission offset of data to be stored next in the relevant transmission-side cache 16, to a value obtained by addition of a size of the data to be transmitted to the transmission offset of the data to be transmitted. Next, the processing proceeds to OP11.

In OP11, the data transmission unit 14 transmits actual data of the data to be transmitted to the reception-side apparatus 2. Subsequently, the processing indicated in FIG. 10 ends, and if data is received from the same application next, the processing starts from OP2.

FIG. 11 is an example of a flowchart of processing in the reception-side apparatus 2. The processing indicated in FIG. 11 is started upon establishment of, for example, a TCP session between the transmission-side apparatus 1 and the reception-side apparatus 2.

In OP21, in the reception-side apparatus 2, initialization processing is performed. More specifically, the cache storage unit 24 sets a reception offset in a reception-side cache 28 for an application for which the session has been established to 0. The table management unit 25 initializes the relevant duplication prediction table 29. Here, since an initial value of the operation mode is the normal mode, the duplication prediction mode entry in the duplication prediction table 29 indicates off. Next, the processing proceeds to OP22.

In OP22, the data reception unit 21 receives data. If the received data is an index (OP23: YES), the processing proceeds to OP24. If the received data is actual data (OP23: NO), the processing proceeds to OP26.

In OP24, the cache reading unit 23 reads a relevant chunk from a reception-side cache 28 for a duplicate application, based on information included in the received index, and restores data. Next, the processing proceeds to OP25.

In OP25, the data transmission unit 26 transmits the data to a destination. Subsequently, the processing indicated in FIG. 11 ends, and if next data is received, the processing starts from OP22.

The processing in OP26 onwards is processing where the received data is actual data. In OP26, the chunk dividing unit 22A divides the received data into chunks. Next, the processing proceeds to OP27.

In OP27, the SHA1 calculation unit 22B calculates SHA1 for each chunk. Next, the processing proceeds to OP28.

In OP28, the hash search unit 22C searches the reception-side caches 28 for the respective applications, for the chunks. If at least one chunk stored in the reception-side caches 28 match SHA1 calculation result (OP29: YES), the processing proceeds to OP33. If no chunk stored in the reception-side caches 28 matches SHA1 calculation result (OP29: NO), the processing proceeds to OP30.

The processing in OP30 and OP31 is processing where no chunk which matches SHA1 calculation result is stored in the reception-side caches 28, that is, the received data is new data. In OP30, the table management unit 25 refers to the duplication prediction table 29 for the application for the received data and determines whether or not the duplication prediction mode entry is "on". If the duplication prediction mode entry is "on" (OP30: YES), the processing proceeds to OP31. If the duplication prediction mode entry is "off" (OP30: NO), the processing proceeds to OP32.

In OP31, the received data is new data and a value of the duplication prediction mode entry is "on", and thus the table management unit 25 detects an end of duplicate reception of data, and sets the duplication prediction mode entry in the duplication prediction table 29 for the application for the received data to "off". As a result of the update of the duplication prediction table 29, the duplication prediction transmission unit 27 transmits duplication prediction information in which the duplication prediction mode entry is "off", to the transmission-side apparatus 1. Next, the processing proceeds to OP32.

In OP32, the cache storage unit 24 stores the chunks of the received data into the relevant reception-side cache 28 and sets a next reception offset. The next reception offset is a value obtained by addition of a size of the chunks to the offset of the stored chunks. Next, the processing proceeds to OP25, and the received data is transmitted to a destination. Subsequently, the processing indicated in FIG. 11 ends, and if next data is received, the processing starts from OP22.

OP33 to OP35 indicate processing where at least one chunk stored in the reception-side cache 28 which match SHA1 calculation result, that is, the received data partly or wholly duplicates the chunks. In OP33, table management unit 25 refers to the duplication prediction table 29 for the application for the received data and determines whether or not the duplication prediction mode entry is "off".

If the duplication prediction mode entry is "on" (OP33: NO), the processing proceeds to OP32. In OP32, if there is a new chunk in the chunks of the received data, the cache storage unit 24 stores the new chunk into the reception-side cache 28 and sets a next reception offset. Subsequently, the processing proceeds to OP25, and the received data is transmitted to the destination.

If the duplication prediction mode entry is "off" (OP33: YES), the processing proceeds to OP34. In OP34, the table management unit 25 updates the duplication prediction table 29 for the application for the received data. More specifically, the table management unit 25 sets the duplication prediction mode entry to "on". Also, the duplicate application entry, the duplicate application duplication start position entry and the current application duplication start position entry are also arbitrarily updated. Next, the processing proceeds to OP35.

In OP35, the duplication prediction transmission unit 27 transmits a content of the updated duplication prediction table to the transmission-side apparatus 1 as a duplication prediction table. Next, the processing proceeds to OP32. In OP32, if there is a new chunk in the chunks of the received data, the cache storage unit 24 stores the new chunk into the reception-side cache 28 and sets a next reception offset. Subsequently, the processing proceeds to OP25, and the received data is transmitted to the destination.

Here, the flowchart indicated in FIG. 11 is an example, and, e.g., the order of the respective processing is not limited to that in the example, and the order may arbitrarily be changed. For example, processing for transmitting the received data to the destination in OP25 may be performed before the duplication prediction information transmission processing in OP31 or OP35.

Specific Example

Figure 12:
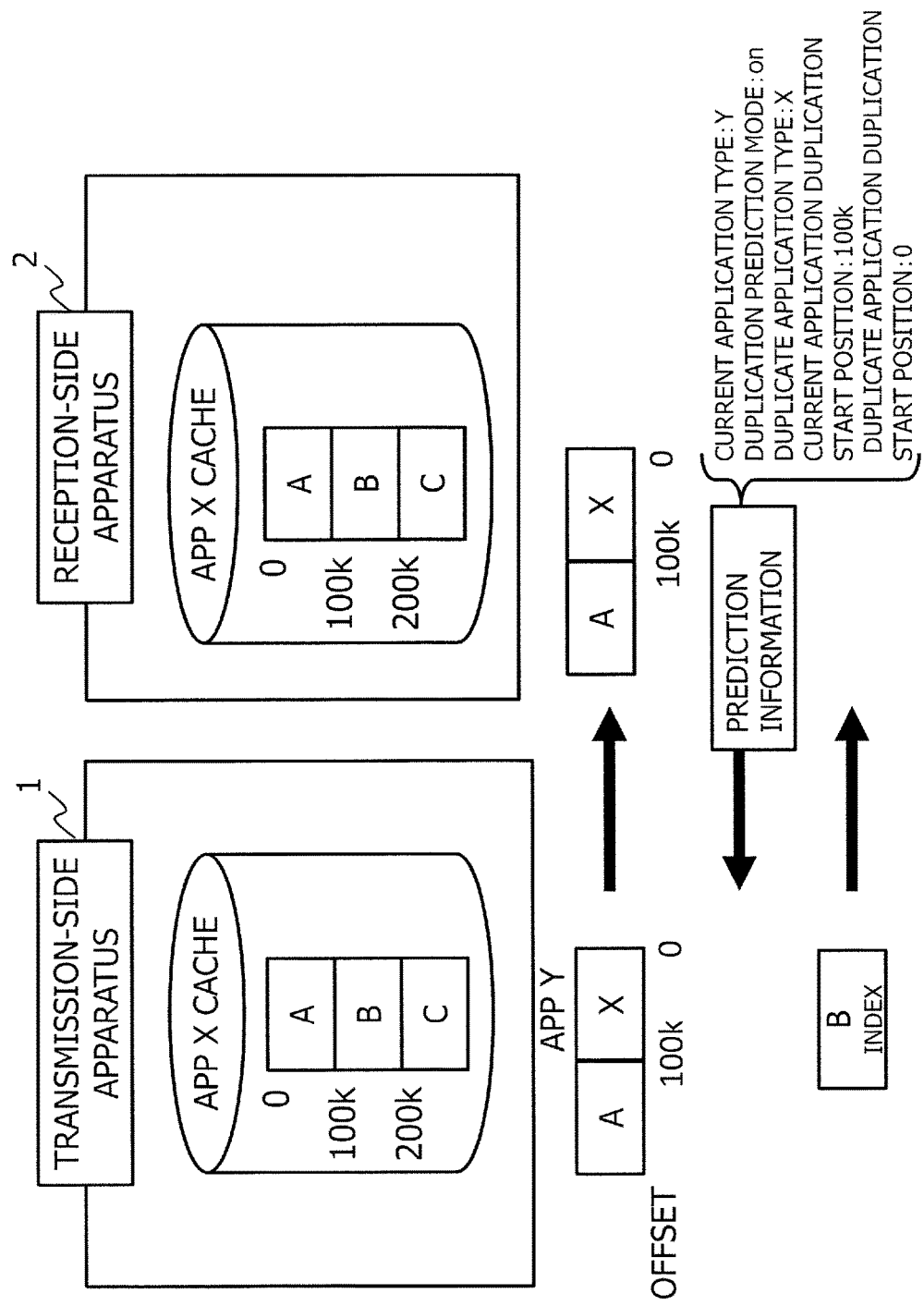
FIG. 12 is a diagram illustrating settings of processing object data in a specific example.

FIG. 12 is a diagram illustrating settings of processing object data in a specific example. In the specific example, the transmission-side apparatus 1 and the reception-side apparatus 2 each retain data A, data B and data C in a cache for application X. Each of data A, data B and data C has 100 KB. In each of the transmission-side apparatus 1 and the reception-side apparatus 2, offsets of data A, data B and data C are 0, 100000 (100 K) and 200000 (200 K), respectively. Here, although the reception-side apparatus 2 retains the respective data in the form of chunks (see FIG. 8), in FIG. 12, for sake of simplicity, the data is illustrated so as to be similar to that of the transmission-side apparatus 1.

In the specific example, it is assumed that the transmission-side apparatus 1 transmits data A and data B after transmission of data X on application Y. It is assumed that a size of data X is 100 KB. In this communication, offsets of data X, data A and data B are 0, 100000 (100 K) and 200000 (200 K), respectively.

Figure 13A:
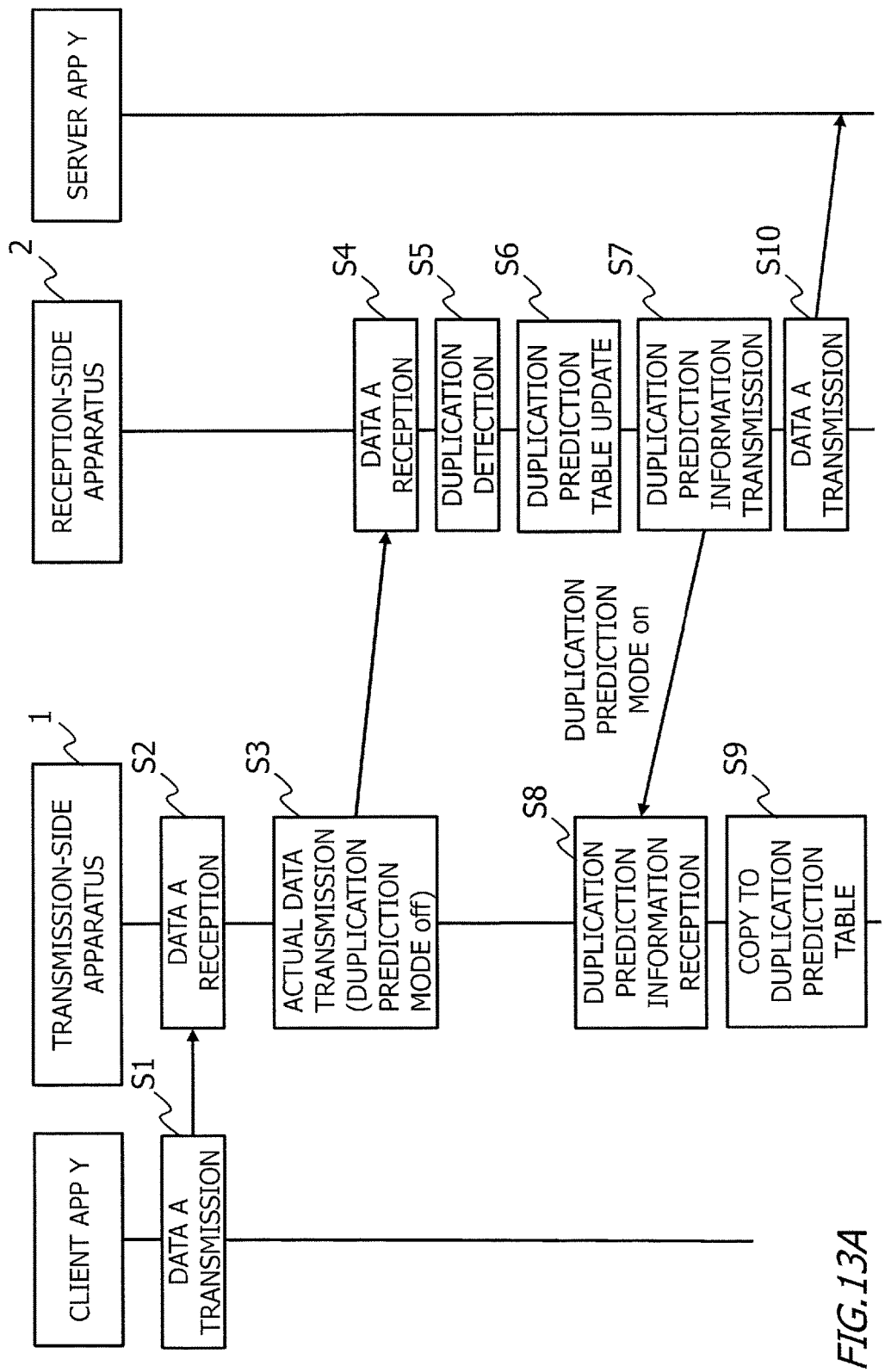
FIG. 13A is an example of a sequence diagram in the specific example.
Figure 13B:
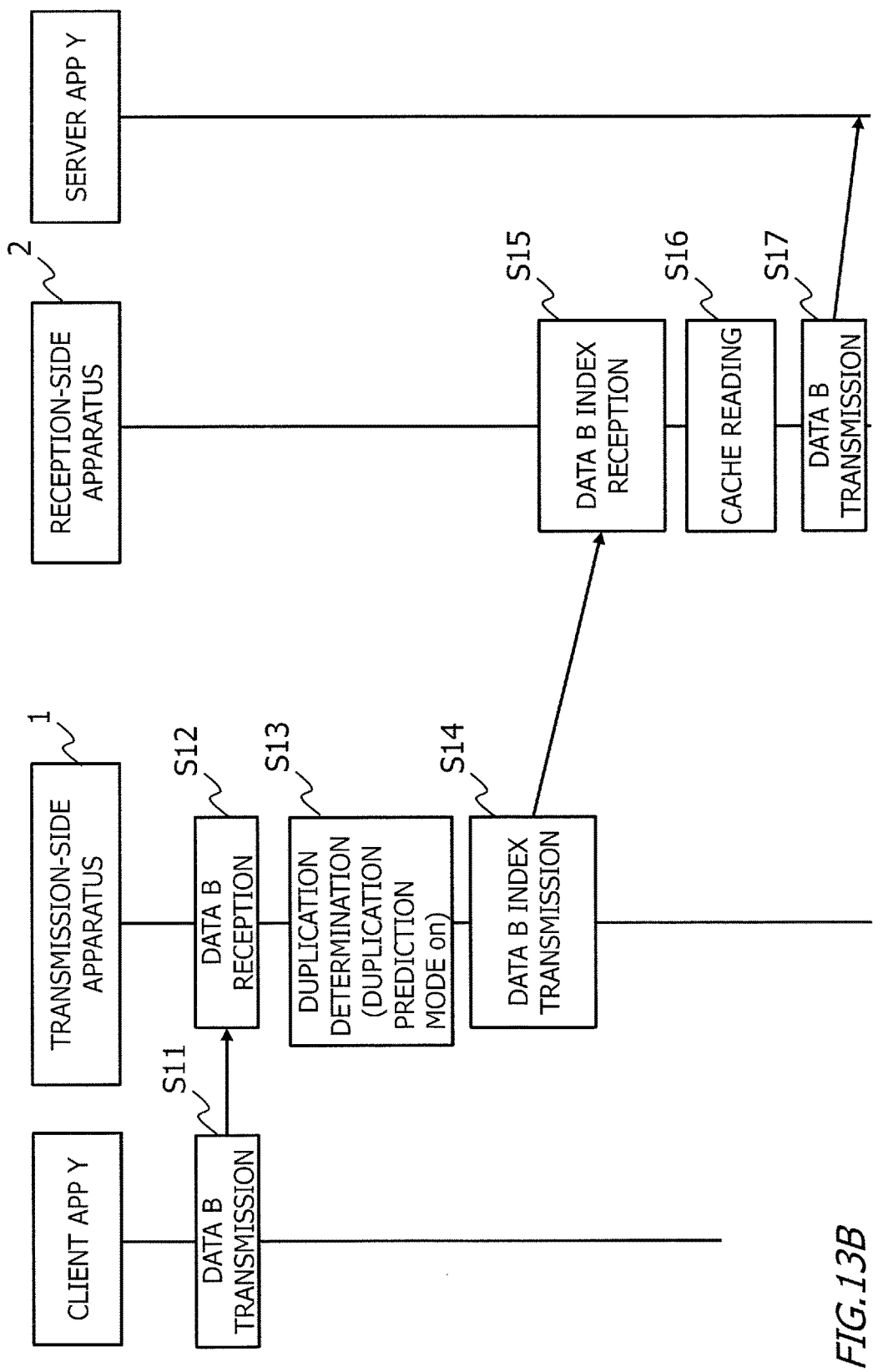
FIG. 13B is an example of a sequence diagram in the specific example.

FIGS. 13A and 13B illustrate an example of a sequence diagram in the specific example. FIG. 13A indicates a case where the transmission-side apparatus 1 transmits data A after transmission of data X on application Y. Here, upon transmission of a connection request from a client apparatus to a server apparatus and reception of the connection request by the transmission-side apparatus 1, a connection request is transmitted from the transmission-side apparatus 1 to the reception-side apparatus 2, whereby processing for establishing a session between the transmission-side apparatus 1 and the reception-side apparatus 2 is performed. Also, concurrently with this, a session is established between the client apparatus and the transmission-side apparatus 1, and also between the reception-side apparatus 2 and the server apparatus.

In S1, the client apparatus transmits data A on application Y. In S2, the transmission-side apparatus 1 receives data A on application Y (OP2 in FIG. 10).

In S3, since the operation mode is the normal mode, which is the initial value (OP5: NO in FIG. 10), the transmission-side apparatus 1 transmits data A to the reception-side apparatus 2 (OP11 in FIG. 10).

In S4, the reception-side apparatus 2 receives data A (OP22 in FIG. 11). In S5, since the received data is actual data A (OP23: NO in FIG. 11), the reception-side apparatus 2 divides data A into chunks, calculates SHA1 for each chunk and searches the caches to detect duplicate reception of data A (OP26 to OP29 in FIG. 11).

In this case, data A is detected from the reception-side cache 28 for application X (see FIG. 12). In other words, the duplicate application is application X, and the duplicate application duplication start position is a reception offset of 0 in the reception-side cache 28 for application X.

In S6, the reception-side apparatus 2 updates the relevant duplication prediction table (OP33 to OP34 in FIG. 11). The duplication prediction mode is changed from off to on. In S7, the reception-side apparatus 2 transmits duplication prediction information to the transmission-side apparatus 1 (OP35 in FIG. 11). The duplication prediction information includes the following information.
(Duplication Prediction Information)
　Current application type: application Y
　Duplication prediction mode: on
　Current application duplication start position: 100000
　Duplicate application type: application X
　Duplicate application duplication start position: 0

In S8, the transmission-side apparatus 1 receives the duplication prediction information (OP2, OP3: YES in FIG. 10). In S9, the transmission-side apparatus 1 copies the duplication prediction information to the duplication prediction table 17 (OP4 in FIG. 10). In S10, the reception-side apparatus 2 transmits data A to a destination (OP25 in FIG. 11).

FIG. 13B indicates a case where the transmission-side apparatus 1 transmits data B on application Y subsequent to the processing in FIG. 13A. In S11, the client apparatus transmits data B on application Y. In S12, the transmission-side apparatus 1 receives data B on application Y (OP2 in FIG. 10).

In S13, since the operation mode is the duplication prediction mode (OP5: YES in FIG. 10), the transmission-side apparatus 1 performs duplication determination for data B. Here, partial data is obtained from the transmission-side cache 16 for application X, which is the duplicate application type in the relevant duplication prediction table.

In the duplication prediction information, duplicate application type: application X, duplicate application duplication start position: 0 and current application duplication start position: 100000. Also, in application Y, an offset of data B is 200000. Therefore, an offset of the partial data in the transmission-side cache 16 for application X is 0+(200000−100000)=100000.

In other words, as the partial data, data with a transmission offset of 100000 in the transmission-side cache 16 for application X is obtained. Since the partial data is data B (see FIG. 12), the transmission-side apparatus 1 detects duplicate transmission (OP7: YES in FIG. 10).

In S14, the transmission-side apparatus 1 transmits an index of data B. The index of data B includes the following information.
(Index of Data B)
　Current application type: Y
　Duplicate application type: X
　Duplicate application duplication start position: 100000
　Data length: 100 KB In S15, the reception-side apparatus 2 receives the index of data B (OP22, OP23: YES in FIG. 11). In S16, the reception-side apparatus 2 reads chunks included in reception offsets of 100000 to 200000 in the reception-side cache 28 for application X based on the information included in the index (OP24 in FIG. 11). In S17, the reception-side apparatus 2 restores data B from the chunks and transmits data B to the destination (OP25 in FIG. 11).

<Operation and Effects of First Embodiment>

In the first embodiment, the reception-side apparatus 2 detects duplicate reception of data and notifies the transmission-side apparatus 1 of duplication prediction information, and the transmission-side apparatus 1 performs relatively low-load duplicate determination processing such as comparison between data to be transmitted and partial data based on the duplication prediction information. Therefore, in the first embodiment, in duplicate data removal processing, a load on the transmission-side apparatus 1 can be reduced.

Chunk division, SHA1 calculation, hash search, etc., are performed by the reception-side apparatus 2, rather than the transmission-side apparatus 1, enables, for example, CPU utilization in the transmission-side apparatus 1 to be reduced to approximately one fourth.

The duplication prediction information includes information such as the duplicate application and the duplication start position in the duplicate application, and thus, the transmission-side apparatus 1 can easily obtain partial data to be compared with data to be transmitted by referring to these pieces of information. Therefore, a processing load on the transmission-side apparatus 1 can further be reduced.

Also, the transmission-side apparatus 1 performs detecting duplication processing using data to be transmitted and partial data on a duplicate application even when the transmission-side apparatus 1 is operating in the duplication prediction mode. If a new part is included in the data to be transmitted, even if the transmission-side apparatus 1 is operating in the duplication prediction mode, the transmission-side apparatus 1 transmits the data to be transmitted to the reception-side apparatus 2. If the reception-side apparatus 2 receives the data to be transmitted (received data for the reception-side apparatus 2), the received data is transferred directly to a destination (OP25 in FIG. 11). Therefore, even if new data is included in the data to be transmitted when the transmission-side apparatus 1 is operating in the duplication prediction mode, the new data is correctly transmitted to the destination.

Also, if the reception-side apparatus 2 receives received data including new data and no duplicate chunk is found for the received data, the reception-side apparatus 2 transmits duplication prediction information with the duplication prediction mode set to "off" to the transmission-side apparatus 1. Upon reception of the duplication prediction information by the transmission-side apparatus 1, the transmission-side apparatus 1 starts operating in the normal mode. Therefore, the reception-side apparatus 2 can control the operation mode of the transmission-side apparatus 1.

According to the above, a load on the transmission-side apparatus 1 is reduced, enabling employment of a relatively low-performance terminal apparatus, for example, a smart phone, a tablet terminal or a PC as the transmission-side apparatus 1. In other words, the data deduplication client program according to the first embodiment can be installed in a terminal apparatus.

FIG. 14 is a diagram indicating effects of the data deduplication system 100 according to the first embodiment. FIG. 14 indicates transfer time in the data deduplication system P100 illustrated in FIG. 1 and transfer time in the data deduplication system 100 according to the first embodiment where traffic data X of 100 Mbit is transferred using a physical channel bw having a transfer rate of 10 Mbps.

It is assumed that a data deduplication processing speed (deduplication speed) dv in the transmission-side apparatus P1 is 10 Mbps. It is also assumed that a deduplication speed dw in the transmission-side apparatus 1 is 40 Mbps. This is because CPU utilization in the transmission-side apparatus 1 is approximately one fourth compared to a case where the transmission-side apparatus performs chunk division, SHA1 calculation and hash search.

Also, it is assumed that 90% of the 100 Mbit traffic data is duplicated. In this case, a proportion of data transmitted in the form of actual data by data deduplication processing is reduced to 10%. In other words, it is assumed that a rate of reduction of actual data by data deduplication processing (rate of reduction by deduplication) r is 0.1.

Based on the above assumptions, (1) if no data deduplication processing is performed, the transfer time is X/bw=100 M/10 Mbps=10 s. (2) In the data deduplication system P100, X/dv+X*r/bw=100 M/10 Mbps+100 M*0.1/10 Mbps=11 s. (3) In the data deduplication system 100, X/dw+X*r/bw=100 M/40 Mbps+100 M*0.1/10 Mbps=3.5 s.

In other words, the data transfer time in the data deduplication system 100 according to the first embodiment is the shortest. Therefore, according to the first embodiment, in communication via a low-speed channel of, e.g., 10 Mbps, a processing load on the transmission-side apparatus 1 is reduced, enabling reduction in time consumed for data transfer.

Also, the transmission-side apparatus 1 and the reception-side apparatus 2 pay no concern to a content of data transmitted or received, when either processing is performed. In other words, whatever data is dealt with an application, the transmission-side apparatus 1 and the reception-side apparatus 2 can perform data deduplication processing irrespective of a content of the data. Therefore, the data deduplication system 100 according to the first embodiment can be employed for a system that performs communication on any application.

The information processing system, the information processing apparatus, the information processing method and the information processing program disclosed enable reduction of a processing load on a transmission-side apparatus in duplicate data removal.

Modification

For example, if a processing load on the CPU of the reception-side apparatus 2 is higher than a predetermined threshold value, the transmission-side apparatus 1 may perform processing for chunk division, SHA1 calculation and hash search. For example, such arrangement is enabled by providing a chunk dividing unit, an SHA1 calculation unit and a hash search unit to a transmission-side apparatus 1 and adding "offload" to the duplication prediction mode in duplication prediction information.

If a CPU load exceeds a predetermined value, a reception-side apparatus 2 transmits duplication prediction information with "offload" set in a duplication prediction mode, to the transmission-side apparatus 1. Upon reception of the duplication prediction information, the transmission-side apparatus 1 outputs data to be transmitted to the chunk dividing unit, the SHA1 calculation unit and the hash search unit, and for example, performs processing that is similar to that performed by the transmission-side apparatus P1 in FIG. 1.

Consequently, if the processing load on the reception-side apparatus 2 is high, the processing load on the reception-side apparatus 2 can be reduced.

Also, although in the first embodiment, no mention of identification of a user of an application, if there is a plurality of users of an application, a transmission-side cache 16 and a reception-side cache 28 are each created for each user and each application. In other words, if there is a plurality of users of an application, transmission-side caches 16 and reception-side caches 28 are identified by a combination of user identification information and application identification information.

<Recording Medium>

A program for causing a computer or another machine or apparatus (hereinafter, "computer or the like") to provide any of the above-described functions can be recorded into a recording medium that can be read by a computer or the like. The program in the recording medium is read into the computer or the like and executed, enabling provision of the function.

Here, the recording medium that can be read by the computer or the like refers to a non-temporary recording medium that can store information such as data and/or programs by means of electrical, magnetic, optical, mechanical or chemical action and can be read from the computer or the like. From among such recording mediums, ones that can be removed from the computer or the like include, for example, a flexible disk, a magneto-optical disk, a CD-ROM, a CD-R/W, DVD, a Blu-ray disk, a DAT, an 8 mm tape and a memory card such as a flash memory. Also, recording mediums fixed to the computer or the like include, e.g., a hard disk and a ROM (read-only memory). Furthermore, a SSD (solid state drive) can be used as either a recording medium that can be removed from the computer or the like or a recording medium fixed to the computer or the like.

All examples and conditional language provided herein are intended for the pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more the embodiment(s) of the present invention have been described in detail, it should be understood that the various changes, substitutions, and alterations could be made hereto without departing from the spirit and scope of the invention.

What is claimed is:

1. An information processing system comprising a transmission-side apparatus and a reception-side apparatus,
the reception-side apparatus including:
a first storage that stores first data which has been received, and
a first processor configured to:
receive data from the transmission-side apparatus,
determine whether or not data duplicating at least a part of the received data is stored in the first storage, and
notify, when data duplicating at least a part of the received data is stored in the first storage, the transmission-side apparatus of prediction information on duplicate reception of the first data, and
the transmission-side apparatus including:
a second storage that stores the first data which has been transmitted, and
a second processor configured to:
compare, when the prediction information is received from the reception-side apparatus, second data to be transmitted and a part of the first data based on the prediction information on duplicate reception,
determine whether or not there is a first part of the first data in the second storage,
the first part of the first data matching the second data, and
transmit, when there is the first part of the first data in the second storage, outline information on the second data instead of the second data,
wherein
the first storage stores a plurality of first data blocks obtained by dividing the first data so that each of the plurality of the first data blocks has a predetermined length, and identification information for each of the plurality of first data blocks; and
the first processor is configured to:
divide the received data into a plurality of second data blocks of the predetermined length,
calculate the identification information for a second data block, and
search for a first data block corresponding to the identification information on the second data block.

2. The information processing system according to claim 1, wherein the first processor is configured to provide the prediction information including a position of the received data from a start of reception and a position of the received data in the first data.

3. The information processing system according to claim 1, wherein the first processor is configured to,
read, when the outline information on the second data is received from the transmission-side apparatus, a second part of the first data blocks from the first storage, the second part matching the second data,
restore the second data from the read second part of the first data blocks, and
transfer the restored second data to a destination.

4. The information processing system according to claim 1, wherein when there is no first part of the first data in the second storage, the second processor is configured to transmit the second data.

5. The information processing system according to claim 4, wherein:
when no third part of the first data is stored in the first storage, the third part matching at least a part of the received data, the first processor is configured to notify the transmission-side apparatus of prediction information on an end of duplicate reception of the first data; and
when the prediction information on the end of duplicate reception of the first data is received, the second processor is configured to transmit the second data.

6. An information processing apparatus comprising: a storage that stores first data which has been received; and
a processor configured to:
receive data from a transmission-side apparatus,
determine whether or not data matching at least a part of the received data is stored in the storage, and
notify, when data matching at least a part of the received data is stored in the storage, the transmission-side apparatus of prediction information on duplicate reception of the first data,
wherein
the storage stores a plurality of first data blocks obtained by dividing the first data so that each of the plurality of the first data blocks has a predetermined length, and identification information for each of the plurality of first data blocks: and
the processor is configured to:
divide the received data into a plurality of second data blocks of the predetermined length,
calculate the identification information for a second data block, and
search for a first data block corresponding to the identification information on the second data block.

* * * * *